United States Patent  
Cui et al.

(10) Patent No.: US 10,928,717 B2
(45) Date of Patent: Feb. 23, 2021

(54) LASER LIGHT SOURCE DRIVING METHOD, LASER LIGHT SOURCE AND LASER PROJECTOR

(71) Applicant: HISENSE LASER DISPLAY CO., LTD., Qingdao (CN)

(72) Inventors: Rongrong Cui, Qingdao (CN); Jianfeng Li, Qingdao (CN)

(73) Assignee: HISENSE LASER DISPLAY GO., LTD., Qingdao (CN)

(*) Notice: Subject to any disclaimer, the term of this patent is extended or adjusted under 35 U.S.C. 154(b) by 0 days.

(21) Appl. No.: 16/708,415

(22) Filed: Dec. 9, 2019

(65) Prior Publication Data

US 2020/0174354 A1 Jun. 4, 2020

Related U.S. Application Data

(63) Continuation of application No. PCT/CN2019/091297, filed on Jun. 14, 2019.

(30) Foreign Application Priority Data

Nov. 30, 2018 (CN) .......................... 201811453168.2

(51) Int. Cl.
G03B 21/20 (2006.01)
(52) U.S. Cl.
CPC ................................ *G03B 21/204* (2013.01)

(58) Field of Classification Search
None
See application file for complete search history.

(56) References Cited

U.S. PATENT DOCUMENTS

2016/0077417 A1 3/2016 Ishikawa

FOREIGN PATENT DOCUMENTS

| CN | 105093794 A | 11/2015 |
| CN | 105353579 A | 2/2016 |
| CN | 105425522 A | 3/2016 |
| CN | 108169990 A | 6/2018 |
| CN | 207676111 U | 7/2018 |

OTHER PUBLICATIONS

The Chinese International Search Report of corresponding International application No. PCT/CN20191091297, dated Aug. 27, 2019.

*Primary Examiner* — Vip Patel
(74) *Attorney, Agent, or Firm* — J.C. Patents

(57) ABSTRACT

The present application discloses a laser light source driving method, a laser light source and a laser projector, and belongs to the field of laser technology. The driving method includes: continuously outputting, by a first laser assembly, laser light in a first color during an output time interval of a ray in the first color; and during at least part of the output time interval of the ray in the first color, exciting a fluorescent sub-assembly with laser light in a second color to induce fluorescence in the first color, and outputting the fluorescence in the first color, the laser light in the second color being emitted by a second laser assembly.

16 Claims, 8 Drawing Sheets

LASER LIGHT SOURCE DRIVING METHOD, LASER LIGHT SOURCE AND LASER PROJECTOR

CROSS REFERENCE TO RELATED APPLICATIONS

The present application is a continuation of International Application No. PCT/CN2019/091297, filed on Jun. 14, 2019, which claims priority to Chinese Patent Application No. 201811453168.2, filed on Nov. 30, 2018, entitled "LASER LIGHT SOURCE DRIVING METHOD, LASER LIGHT SOURCE AND LASER PROJECTOR", the contents of which are incorporated by reference herein in their entireties.

TECHNICAL FIELD

The present application relates to the field of laser technology, and particularly to a laser light source driving method, a laser light source and a laser projector.

BACKGROUND

At present, a laser projector may include a laser light source and an optical engine illuminating apparatus. The laser light source includes an optical path assembly and a light source assembly. The light source assembly is configured to supply the laser light source, and the optical path assembly is configured to modulate laser light emitted by the light source assembly and input the same into the optical engine illuminating apparatus. The modulating procedure may include exciting rays of other colors by the laser light emitted by the light source assembly, and selecting a ray from rays of various colors. When the laser light source input a ray into an optical engine illuminating apparatus, different colors of light have different output time intervals according to a predefined setting. When an output time interval for light of a particular color is reached, the laser light source inputs the light corresponding to the time interval into the optical engine illuminating apparatus.

In a laser light source, a light source assembly includes a red laser and a blue laser, and an optical path assembly includes a fluorescent wheel. During an output time interval for red light, the optical path assembly is configured to control the red light emitted by the red laser to radiate directly to the optical engine illuminating apparatus. During an output time interval for light of other colors, the optical path assembly is configured to control the blue laser light emitted by the blue laser to radiate onto the fluorescent wheel in order to induce light in another color, which is then inputted as primary color light into the optical engine illuminating apparatus.

SUMMARY

According to a first aspect of the present application, a laser light source driving method is provided, including:
continuously outputting, by a first laser assembly, laser light in a first color during an output time interval of a ray in the first color; and
during at least part of the output time interval of the ray in the first color, exciting a fluorescent sub-assembly with laser light in a second color to induce fluorescence in the first color, and outputting the fluorescence in the first color, the laser light in the second color being emitted by a second laser assembly.

According to a second aspect of the present application, a laser light source is provided, including an optical path assembly and at least two laser assemblies, where the optical path assembly includes a fluorescent sub-assembly, the at least two laser assemblies include a first laser assembly for emitting laser light in a first color and a second laser assembly for emitting laser light in a second color, and the first laser assembly is configured to continuously output the laser light in the first color from the laser light source during an output time interval of a ray in the first color;
the second laser assembly and the fluorescent sub-assembly are configured to, during at least part of the output time interval of the ray in the first color, induce fluorescence in the first color, and output the fluorescence in the first color from the laser light source.

In some embodiments, the optical path assembly further includes a filter sub-assembly, the fluorescent sub-assembly includes a partition for fluorescent in a third color for inducing the fluorescence in the third color, where the fluorescence in the third color is mixed fluorescence combining the fluorescence in the first color and fluorescence in a fourth color; the second laser assembly is configured to input laser light in the second color into the partition for the fluorescent in the third color of the fluorescent sub-assembly to induce the fluorescence in the third color during the at least part of the output time interval of the ray in the first color;
the filter sub-assembly is configured to filter out the fluorescence in the fourth color from the fluorescence in the third color to derive the fluorescence in the first color; and
the optical path assembly is configured to output the fluorescence in the first color from the laser light source.

According to a third aspect of the present application, a laser projector is provided, including an optical engine illuminating apparatus and a laser light source according to the second aspect.

BRIEF DESCRIPTION OF THE DRAWINGS

In order to more clearly illustrate the technical solutions in the embodiments of the present application, the drawings required in describing the embodiments will be briefly introduced below. Apparently, the drawings described in the following are only for some embodiments of the present application, and other drawings can be obtained based on these drawings by those skilled in the art without paying any creative labor.

DETAILED DESCRIPTION OF THE EMBODIMENTS

In order to make objectives, technical solutions and advantages of the present application clearer, implementations of the present application will be elaborated in more detailed in conjuncture with the accompanying drawings in the below.

A laser light can have a wider interference fringe interval when it has longer wavelength, which can cause a speckle effect, i.e., speckle-like bright spots that on a surface of an object illuminated by the laser light, that can be easily noticeable to human eyes, thus more significantly degrading the imaging quality of the rays emitted by the light source apparatus. Illustratively, red light and green light, whose wavelengths are relatively long, are more likely to cause the speckle effect. At present, when laser light is used as a light source for a laser projector, the speckle effect can seriously undercut the imaging quality of the laser projector.

Embodiments of the present application provide a laser light source driving method, a light source apparatus and a laser projector, which are capable of solving the problem presented in the related art.

Figure 1:
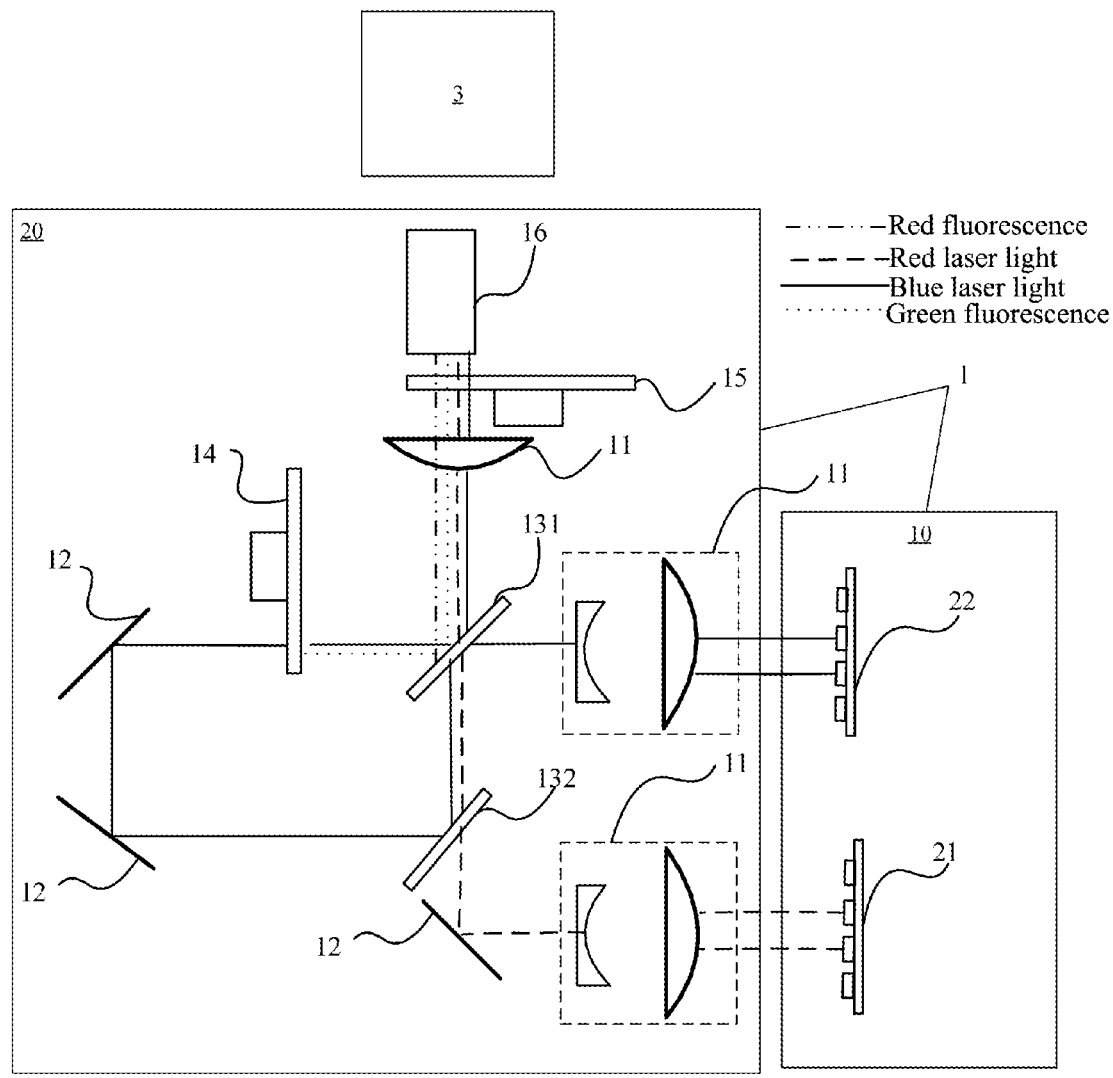
FIG. 1 is a schematic structural diagram of a laser projector provided in an embodiment of the present application.

FIG. 1 is a schematic diagram of an implementation environment in some embodiments of the present application, where the implementation environment may include a laser light source 1 and an optical engine illuminating apparatus 3. The implementation environment may be a laser projector with a dual-color light source, and the dual-color light source is the light source with two laser assembly of two colors.

The laser light source 1 includes a laser 10 and an optical path assembly 20.

The laser 10 is configured to provide laser light that serves as a light source. The optical path assembly 20 is configured to modulate the laser light emitted by the laser 10 and input the same into the optical engine illuminating apparatus 3. The modulating procedure may involve exciting light of other colors by the laser light emitted by the laser source, and selecting a ray form rays of various colors. The optical engine illuminating apparatus 3 is configured to output a ray that has been modulated by the optical path assembly.

The optical path assembly 20 may include a lens assembly 11, a mirror assembly 12, a first light combination mirror 131, a second light combination mirror 132, a fluorescent wheel 14 (which may be provided as a fluorescent sub-assembly), a filter wheel 15 (which may be provided as a filter sub-assembly) and a light homogenizing element 16. The laser 10 may include a first laser assembly 21 for emitting a laser light in a first color, and a second laser assembly 22 for emitting a laser light in a second color.

Rays emitted by the first laser assembly 21 pass through the lens assembly 11, are reflected by the mirror assembly 12, pass through two light combination mirrors 131 and 132, the filter wheel 15 and the light homogenizing element 16, and then radiates into the optical engine illuminating apparatus 3. In some embodiments, the rays emitted by the first laser assembly 21 may be red light and green light, whose wavelengths are relatively long.

Rays emitted by the second laser assembly 22 may be configured to induce light in other colors. In some embodiments, the rays emitted by the second laser assembly 22 may be a blue light with a shorter wavelength. The blue light and the fluorescent wheel may be used to induce green light and yellow light, where the yellow light may be configured to enhance the overall brightness of the rays, as well as providing red fluorescence.

The light combination mirror 132 allows passage to red laser light while reflects blue laser light, and the light combination mirror 131 allows passage to blue laser light and red laser light while reflects light in other colors, for example, green laser light and yellow laser light. The fluorescent wheel 14 may include a non-opaque partition and a fluorescent partition, where the fluorescent partition may include: a first partition for fluorescent in a third color configured to induce the fluorescence in the third color, and a second partition for the fluorescent in the third color, where the first partition for the fluorescent in the third color includes a reflecting piece and fluorescent material provided thereon for inducing the fluorescence in the third color, where the fluorescence in the third color is mixed fluorescence combining the fluorescence in the first and fluorescence in a fourth color. The first partition for the fluorescent in the third color may be configured to provide the fluorescence in the first color.

In some embodiments, the first color is red, the second color is blue, the third color is yellow, and the fourth color is green.

Figure 2:
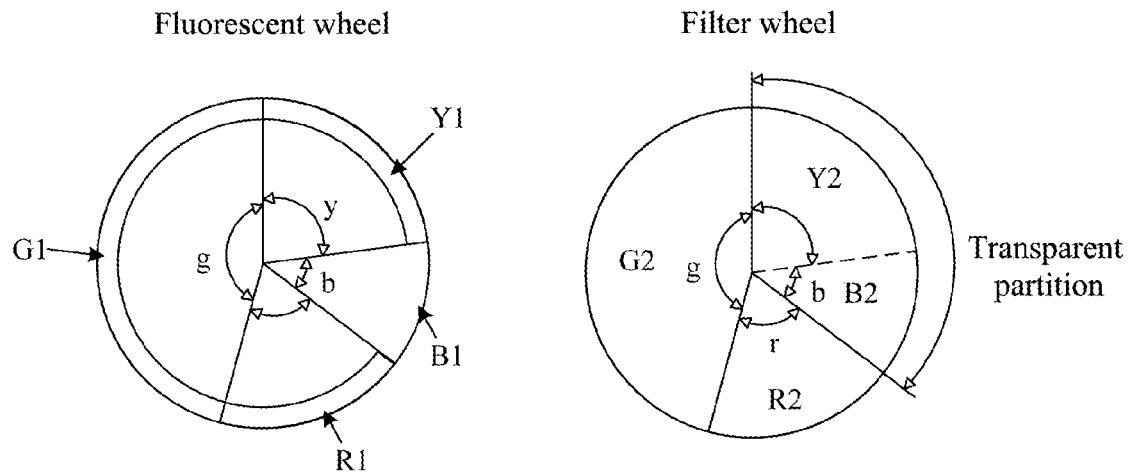
FIG. 2 is a schematic structural diagram of a fluorescent wheel and a filter wheel in the laser projector as shown in FIG. 1.

Reference is made to FIG. 2, which is a schematic structural diagram of a fluorescent wheel and a filter wheel as provided in an embodiment of the present application. The fluorescent wheel includes a first yellow fluorescent partition Y1 with a central angle of y, which is configured to induce yellow fluorescence; a green fluorescent partition G1 with a central angle of g, which is configured to induce green fluorescence; a transparent partition B1 with a central angle of b; and a second yellow fluorescent partition R1 with a central angle of r, which is configured to induce yellow fluorescence. The second yellow fluorescent partition R1 can be configured to provide red fluorescence (i.e., the yellow fluorescence includes the red fluorescence therein). Here, $r+g+y+b=360$.

The filter wheel include a green non-opaque partition G2 with a central angle of g; a transparent partition, including: a yellow light transparent partition Y2 with a central angle of y, which is configured to allow passage to yellow light; and a blue light transparent partition B2 with a central angle of b, which is configured to allow passage to blue light; and a red light non-opaque partition R2 with a central angle of r, which corresponds to the second yellow fluorescent partition R1, and is configured to filter out color light other than red light from the yellow light excited by the second yellow fluorescent partition R1 in order to derive red fluorescence.

In some embodiments, the fluorescent wheel and the filter wheel rotate cyclically at a uniform speed. Based on the angles for various primary color light, i.e., the red, green, yellow and blue light, in the filter wheel, a calculation may be made to derive output time intervals corresponding to the R (red light), G (green light), Y (yellow light) and B (blue light), respectively. When the fluorescent wheel and the filter wheel have a rotational period of T, which may be, e.g., 60 Hz, 120 Hz or 240 Hz, the output time intervals of the laser projector for the red light, green light, yellow light and blue light may be $rT/360$, $gT/360$, $yT/360$ and $bT/360$, respectively. During a period, a control signal is at high level for the various primary color light within the output time intervals for RGYB primary color lights. For instance, a red light output control signal is at high level during the time interval $rT/360$ for the red light output, but at low level during other time intervals. This is because the four primary color light, i.e., the red, green, yellow and blue light, are output according to a timing sequence, rather than simultaneously. Thus, the corresponding control signals are at high level while the green, yellow and blue light are being outputted, and at low levels during other time intervals.

The blue light that enters into the optical engine illuminating apparatus 3 comes from a laser light that is emitted by the second laser assembly 22, passes through the lens assembly 11, the light combination mirror 131, and a non-opaque partition of the fluorescent wheel 14, then is reflected by the mirror assembly 12 and the light combination mirror 132, then passes through the light combination mirror 131, the lens assembly 11, then is filtered by the filter wheel 15, then is homogenized by the light homogenizing element 16, and finally enters into the optical engine illuminating apparatus 3.

The yellow fluorescence and green fluorescence that enter into the optical engine illuminating apparatus 3 may come from a laser light that is emitted by the second laser assembly 22, passes through the lens assembly 11 and the light combination mirror 131, and radiates onto a fluorescent material on the fluorescent wheel 14. When radiating onto yellow fluorescent material or green fluorescent material, the yellow fluorescent material or green fluorescent material will be excited to produce yellow fluorescence and green fluorescence. The color light thus produced is reflected back by a reflecting piece of the fluorescent wheel 14, and then is reflected by the light combination mirror 131, and passes through the lens assembly 11. The green fluorescence or yellow fluorescence is filtered by the filter wheel 15 and homogenized by the light homogenizing element 16, and then enters into the optical engine illuminating apparatus 3.

The red, green, blue and yellow primary color lights in the laser projector with the dual-color light source as illustrated in FIG. 1 may be produced from blue laser light and red laser light. During an output period of primary color light, the red laser light source (which can be the first laser assembly 21) is lit when red light is being outputted. The second laser assembly 22 may be controlled to light up to output red fluorescence simultaneously. Instead, when green light, yellow light or blue light is being outputted, the second laser assembly 22 is lit while the first laser assembly 21 goes off.

In some embodiments, for the structure of the optical path assembly 12 in the laser projector as provided in the embodiment of the present application, reference may be made to a laser projector with a dual-color light source in the related art, which will not be repeated herein.

Figure 3:
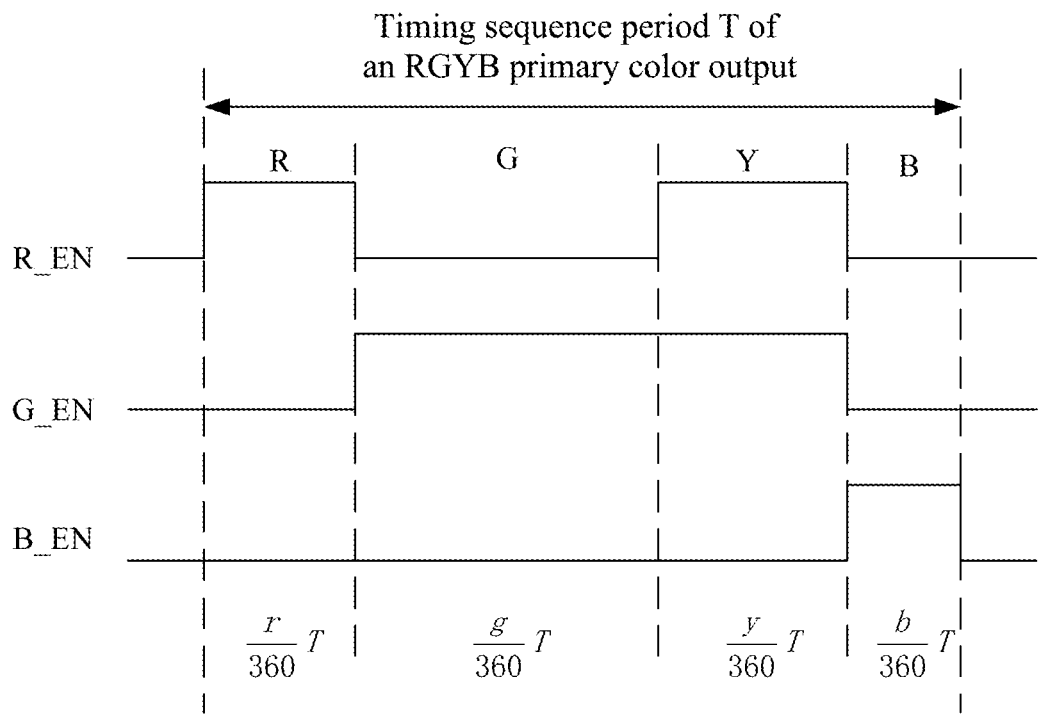
FIG. 3 is a schematic oscillogram of a controlling signal provided in an embodiment of the present application.

In the related art, a laser projector does not typically use yellow light as primary color light. This is why a projection system only includes control signals for three primary colors, i.e., red light, green light and blue light, which are represented by R_EN, G_EN and B_EN, respectively. The yellow light is considered as a composition light of red light and green light, hence a logical signal where the red light control signal R_EN and the green light control signal G_EN are at high level simultaneously to indicate a yellow light output control signal. That is, when the red light control signal R_EN is at high level, it includes two segments of high levels for the red light output time interval and the yellow light output time interval. Similarly, when the green light control signal G_EN is at high level, it also includes two segments of high levels for the green light output time interval and the yellow light output time interval. According to the angel value assumed by the red light, green light, yellow light and blue light on the filter wheel, the output duration for each primary color light within one rotational period can be derived. Illustratively, a logic control waveform for the red light control signal R_EN, green light control signal G_EN and blue light control signal B_EN may be as shown in FIG. 3. The driving and controlling circuit for the laser light source (the circuit may be included in the laser 10) performs a logic calculation according to the red light, green light and blue light control signals R_EN, G_EN and B_EN, and then control the lighting of the blue laser light source and red laser light source, thus synchronizing the timing sequence and the output time of the RGYB primary color output from the fluorescent wheel and filter wheel with the lighting of the laser light source.

As shown in FIG. 3, during a rotational period of the fluorescent wheel and the filter wheel, the red light control signal R_EN includes both the red light output control signal and the yellow light output control signal. Since the primary color light for the laser projector follow an output timing sequence of RGYB (other timing sequence is also possible, which is not limited to the embodiment of the present application), the red light output and the yellow light output are within non-contiguous time intervals, i.e., they are spaced by the green light output time interval. Hence, a logic waveform for the red light control signal includes two segments of high level, one of which is a high level that spans for the rT/360 of the red light output time, and another one is a high level that spans for the yT/360 of the yellow light output time. Likewise, the green light control signal G_EN includes both the green light output control signal and the yellow light output control signal. However, the output timing sequences of the green light and yellow light are contiguous, the green light control signal includes a high level waveform that encompasses the green light output time and the yellow light output time gT/360+yT/360, where the two segments of high level are contiguous. The blue light control signal B_EN includes only one high level waveform that spans the blue light output time bT/360.

Figure 4:
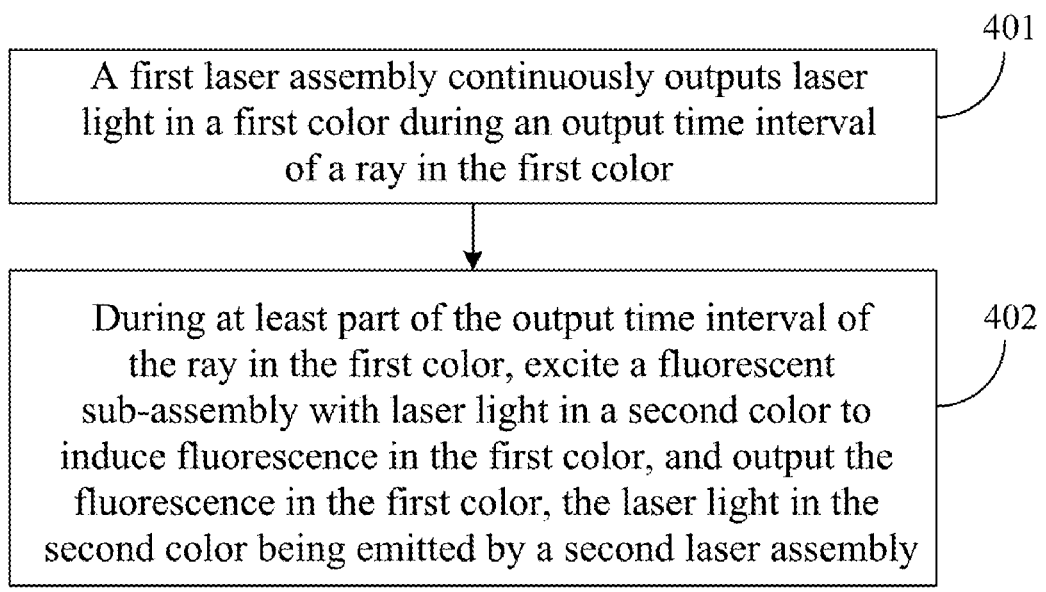
FIG. 4 is a flowchart of a laser light source driving method provided in an embodiment of the present application.

FIG. 4 is a flowchart of a laser light source driving method provided in an embodiment of the present application. The method is applicable to a laser light source which may have been described in the foregoing embodiments. The method includes steps as follows.

Step 401: a first laser assembly continuously outputs laser light in a first color during an output time interval of a ray in the first color.

Step 402: during at least part of the output time interval of the ray in the first color, excite a fluorescent sub-assembly with laser light in a second color to induce fluorescence in the first color, and output the fluorescence in the first color, the laser light in the second color being emitted by a second laser assembly.

The at least part of the output time interval may include part or all of the output time interval of the ray in the first color. The at least part of the output time interval may be distributed in the output time interval of the ray in the first color following one of two modes.

In a first distributing mode, the at least part of the output time interval is a continuous time interval located within the output time interval of the ray in the first color.

In a second distribution mode, the at least part of the output time interval includes multiple non-continuous sub-time intervals which may be distributed in the output time interval of the ray in the first color. When the multiple non-continuous sub-time intervals are uniformly distributed throughout the output time interval of the ray in the first color, because the laser light in the first color is uniformly doped with the fluorescence in the first color, the second distribution mode is more desirable for eliminating the speckles compared with the first distribution mode where fluorescent doping is absent for a more extended time interval (during which the speckle effect is more likely to be detected by human eyes). In view of the foregoing, in the laser light source driving method provided in the embodiment of the present application, a first laser assembly outputs laser light in a first color from a laser light source during an output time interval of a ray in the first color, while a second laser assembly and a fluorescent sub-assembly produces, by way of excitation, fluorescence in the first color and output the fluorescence in the first color from the laser light source, thus enabling the laser light source to simultaneously output both the laser light in the first color and the fluorescence in the first color during the output time interval of the ray in the first color. Since the laser light in the first color and the fluorescence in the first color have different wavelengths, coherence effect will not happen. This solves the problem in the related art that among rays emitted by the light source apparatus, rays with longer wavelengths will interfere with each other to cause a speckle effect, thereby resulting in low imaging quality of the rays emitted by the light source apparatus. The technical effect is achieved in terms of avoiding the speckle effect caused by the coherence effect of the rays and enhancing imaging quality of the rays.

Figure 5:
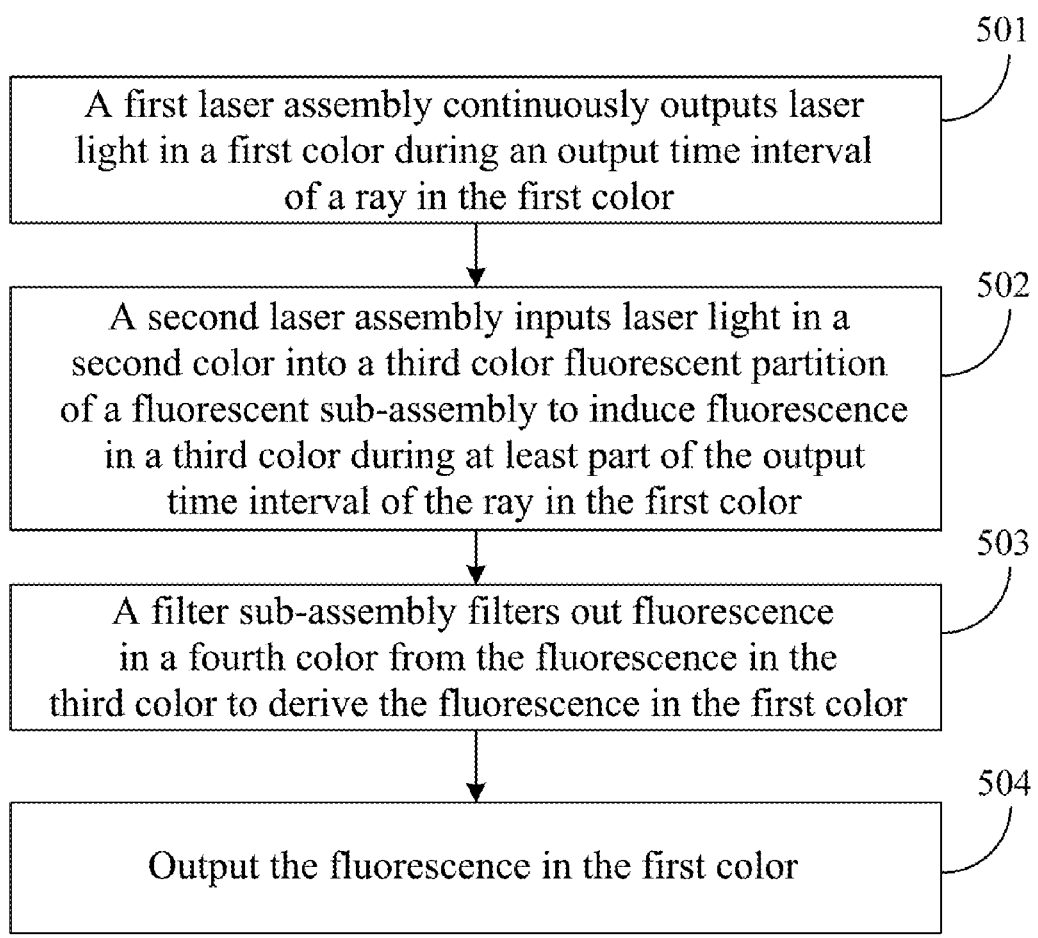
FIG. 5 is a flowchart of another laser light source driving method provided in an embodiment of the present application.

FIG. 5 is a flowchart of another laser light source driving method provided in an embodiment of the present application. The method is applicable to a laser light source which may have been described in the foregoing embodiments. The method includes steps as follows.

Step 501: a first laser assembly continuously outputs laser light in a first color during an output time interval of a ray in the first color.

The specific manner for the first laser assembly to output the laser light in the first color may be found in the foregoing embodiments, and will not be repeated herein.

The laser light in the first color may come out of the laser light source and enter into an optical engine illuminating apparatus.

Figure 6:
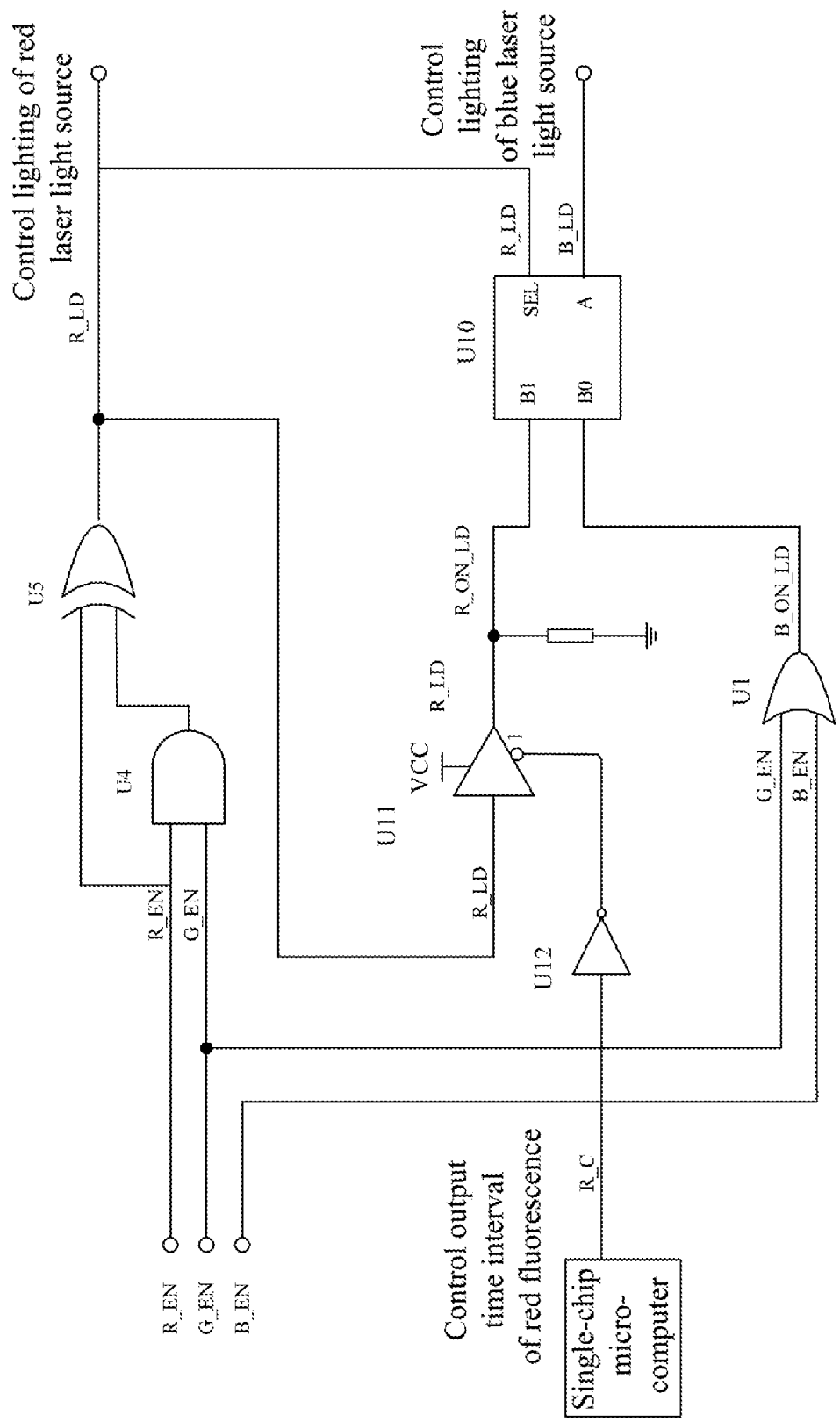
FIG. 6 is a schematic diagram of a circuitry structure in the embodiment as shown in FIG. 5.

In the laser light source to which the laser light source driving method provided in the embodiment of the present application is applied, the laser light source may include a controlling circuit that may be structured as shown in FIG. 6.

Figure 7:
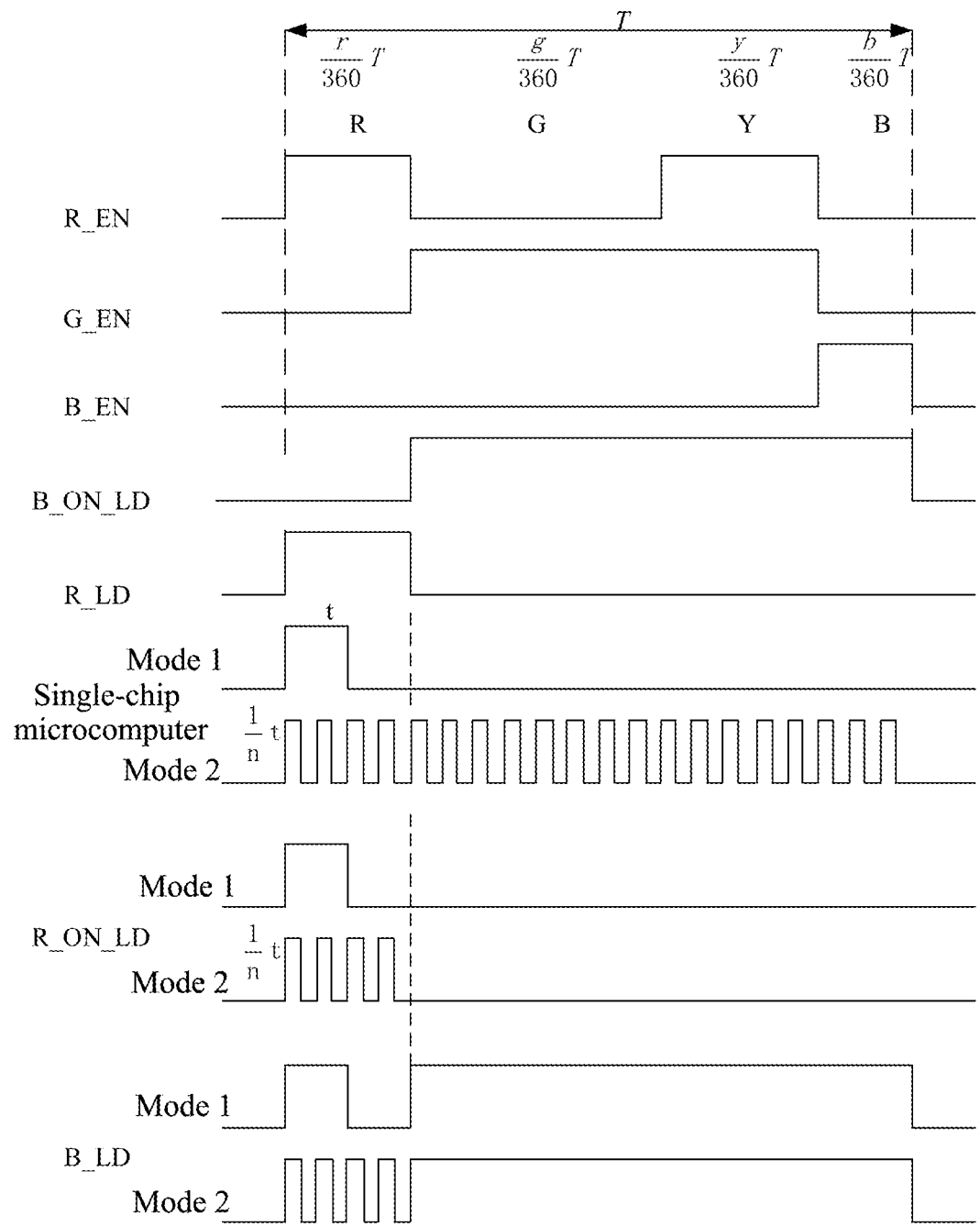
FIG. 7 is a schematic oscillogram of various signals in the circuitry structure as shown in FIG. 6.

During an image output period T, a red light control signal R_EN of the projection system includes control signals for red light output and yellow light output, a green light control signal G_EN includes control signals for green light output and yellow light output. Thus, the red light control signal R_EN and green light control signal G_EN can derive to a yellow light output control signal when inputted into a component U4 to undergo a logic AND operation. The yellow light output control signal and the red light control signal R_EN, which includes the yellow light output control signal, are inputted into a component U5 to undergo a logic XOR operation to derive a red light output control signal R_LD. That is, a time length is derived for controlling the red laser light source to be lit. The R_LD is at high level for the same duration in which the red laser light source is lit, which is r/360 T, and the waveform may be as shown in FIG. 7. The R_LD is at low level for the same duration in which the blue laser light source is lit, which may be the green light output time interval, blue light output time interval and/or yellow light output time interval.

Step 502: a second laser assembly inputs laser light in a second color into a partition for fluorescent in a third color of a fluorescent sub-assembly to induce the fluorescence in the third color during at least part of the output time interval of the ray in the first color.

The at least part of the output time interval is a predefined time interval intended for outputting red fluorescence. That is, while the red laser light source is lit, the blue laser light source may be lit to induce the red fluorescence, a length of whose output time interval may be in the range of $0 \leq t \leq r/360$ T. Additionally, the length of the output time interval of the red fluorescence may be pre-configured. The red fluorescence is inputted into an optical path to mix with the red laser light, which allows for enhancing an intensity of the red light while reducing the speckle effect.

As shown in FIG. 6, the red light output control signal R_LD may serve as a selecting signal for a selection component U10. When the R_LD is at high level, the selection component U10 takes an input signal at pin B1 to pin A of the U10. That is, the output time interval of the red fluorescence now serves as a control signal for lighting the blue laser light source, thus implementing control over the time length for outputting the red fluorescence. When the R_LD is at low level, the output time intervals for the green light, blue light and yellow light are on, and the selection component U10 takes an input signal at pin B0 to the output pin A to use the signal to light the blue laser light source. The pin B0 on the selection component U10 corresponds to a lighting control signal B_LD for the blue laser light source, which is obtained by undergoing logic OR operation on the green light control signal G_EN and the blue light control signal B_EN by a component U1. The signal B_LD controls a blue laser light driving circuit to light the blue laser light, outputting the green light, blue light and yellow light for the system.

In an embodiment of the present application, the output time interval of the red fluorescence may include the following configuration modes.

Mode 1: the at least part of the output time interval includes a continuous time interval within the output time interval of the ray in the first color, and the length of the at least part of the output time interval are less than or equal to that of the output time interval of the ray in the first color.

As shown in FIG. 6, a single-chip microcomputer is triggered by the red light output control signal R_LD to emit a waveform of a time length t to light the red fluorescence according to the time length rT/360 of the red light output time interval within a single period. A beginning moment is the same as that of the red light output. A timer keeps the time. When the time length reaches t, the single-chip microcomputer is triggered to emit a waveform at low level. As shown in FIG. 7, a waveform pattern 1 emitted by the single-chip microcomputer is a continuous high level waveform that has a length of t, where $0 \leq t \leq rT/360$. That is, a continuous high level spans [0, t], a low level spans [t, r/360 T]. Thus, during the output time period r/360 T of the red laser light, the laser light source introduces the red fluorescence for the time interval [0, t] of continuous high level, and the blue laser light source is lit. For the time interval [t, r/360 T] of low level, no red fluorescence is outputted, and the blue laser light source is not lit. A circuit structure may be shown as FIG. 6. The high level signal emitted by the single-chip microcomputer for the time interval of [0, t] is inverted by an inverter U12 to low level. This low level signal is inputted into pin 1 of a component U11 as a selection signal, as the pin 1 is enabled at low level. The component U11 is in closed gate. The red light output control signal R_LD is outputted to derive the red fluorescence output signal R_ON_LD. The R_ON_LD is at high level for the duration of [0, t], while the red light output control signal R_LD controls the U10 selection output component to make the B1 passage in closed gate to output to the pin A, and light the red fluorescence from the blue laser light source output system. Within the duration [t, r/360 T], the single-chip microcomputer emits a low level signal. Within the output time intervals of other primary color lights, the signal is also at low level, which passes through the inverter U12 to become a high level. The component U1f is in open gate. The input of the pin B1 of the component U10 is at low level, output to the pin A at low level, and the blue laser light source is not lit.

Mode 2: the at least part of the output time interval includes multiple non-continuous sub-time intervals within the output time interval of the ray in the first color.

In some embodiments, the multiple non-continuous sub-time intervals are uniformly distributed in the output time interval of the ray in the first color.

During an output period of primary color light T, the red light output has a time length of r/360 T. If the red laser light is doped with red fluorescence for a time length t, $0 \leq t \leq r/360$ T, then the red fluorescence doped for the time length t is split into n parts (i.e., the at least part of the output time interval includes multiple sub-time intervals within the output time interval of the ray in the first color). In this case, a control waveform outputted by the single-chip microcomputer is a using pulse width modulation (PWM) waveform whose high level has a time length of lt/n. As shown in FIG. 7, the single-chip microcomputer is triggered by the red light output control signal R_LD for a duration of an output period of a primary color light to continuously output a PWM waveform whose high level has a time length of lt/n. Additionally, the single-chip microcomputer initially outputs the PWM waveform at high level. In this way, coding work can be simpler for the software of the single-chip microcomputer, and complex programs, such as time-keeping by a timer, can be unnecessary.

The PWM waveform signal emitted by the single-chip microcomputer passes through the inverter U12, and is then fed into a selection pin of the U11 to control the output of the red light output control signal R_LD. When the PWM signal is at high level, the U11 is in closed gate, and the output is at high level. When the PWM signal is at low level, the U11 is in open gate, the output is at low level, thus generating the red fluorescence output signal R_ON_LD, whose waveform may be as shown in FIG. 7. The red fluorescence output signal R_ON_LD is a result of a logic OR operation on the red light output control signal R_LD and the PWM waveform with the high level for lt/n emitted by the single-chip microcomputer.

FIG. 7 illustrates waveforms of various signals in the laser light source provided in an embodiment of the present application. The control signal R_LD, which controls the lighting of the red laser light source, follows a logic formula of R_LD=(R_EN∩G_EN)⊕R_EN, and the red laser light source is lit when there is only the red light output. The red fluorescence output control signal follows a logic formula of R_ON_LD=$\overline{R\_C}$∩R_LD. The control signal that controls the lighting of the blue laser light source when green light, blue light and yellow light output exist follows a logic formula of B_ON_LD=G_EN∪B_EN. The control signal that controls the lighting of the blue laser light source follows a logic formula of B_LD=R_ON_LD∪B_ON_LD. The blue laser light source is always lit when the red fluorescence, green light, blue light and yellow light output exist.

As shown in FIG. 6, when the red light output control signal R_LD is at high level, the component U10 has its output selection pin B1 set to red fluorescence output signal R_ON_LD. The red fluorescence output signal R_ON_LD controls the lighting of the blue laser light source. When the R_ON_LD is at high level, the blue laser light source is lit, and the red fluorescence is outputted. When the R_ON_LD is at low level, the blue laser light source is not lit, and there is no red fluorescence output. Thus, in the red light output period rT/360, there are n red fluorescence of time length lt/n doped into the red laser light. For the duration of rT/360−t, no red fluorescence is doped, and the blue laser light source is not lit.

When the red light output control signal R_LD is at low level, the component U10 has its output selection pin B0 to use a result of a logic OR operation on the green light control signal G_EN and the blue light control signal B_EN as the control signal to light the laser light source, lighting the blue laser light source to output green light, blue light and yellow light.

When $0<t<r$ T/360, in the above Mode 1, the red fluorescence is doped for a continuous time interval of t, while in the above Mode 2, the red fluorescence is doped by n times for a total duration of t in the form of PWM signals. In addition to a simpler software program for the single-chip microcomputer in Mode 2 than in Mode 1, the red fluorescence is doped by n times during the output process of the red laser light, allowing the red laser light to be more evenly doped with the red fluorescence. Compared with Mode 1 where fluorescent doping is absent for a more extended time interval (during which the speckle effect is more likely to be detected by human eyes), the second distribution mode is more desirable for eliminating the speckles.

Step 503: a filter sub-assembly filters out fluorescence in a fourth color from the fluorescence in the third color to derive the fluorescence in the first color.

For more details about the filter sub-assembly, reference may be made to the filter wheel described in the foregoing embodiments, which will not be repeated herein.

Step 504: output the fluorescence in the first color.

The laser light source may output the fluorescence in the first color, and input the same into the optical engine illuminating apparatus.

In view of the foregoing, in the laser light source driving method provided in the embodiment of the present application, a first laser assembly outputs laser light in a first color from a laser light source during an output time interval of a ray in the first color, while a second laser assembly and a fluorescent sub-assembly produces, by way of excitation, fluorescence in the first color and output the fluorescence in the first color from the laser light source, thus enabling the laser light source to simultaneously output both the laser light in the first color and the fluorescence in the first color during the output time interval of the ray in the first color. The fluorescence in the first color has a relatively wider spectrum, and is thus less likely to interfere with the laser in the first color. This solves the problem in the related art that an imaging quality of the rays emitted by the light source apparatus is significantly degraded by the interference fringes caused by the rays with long wavelengths among rays emitted by the light source apparatus. Thus, an effect of improving an imaging quality of the rays is achieved.

Figure 8:
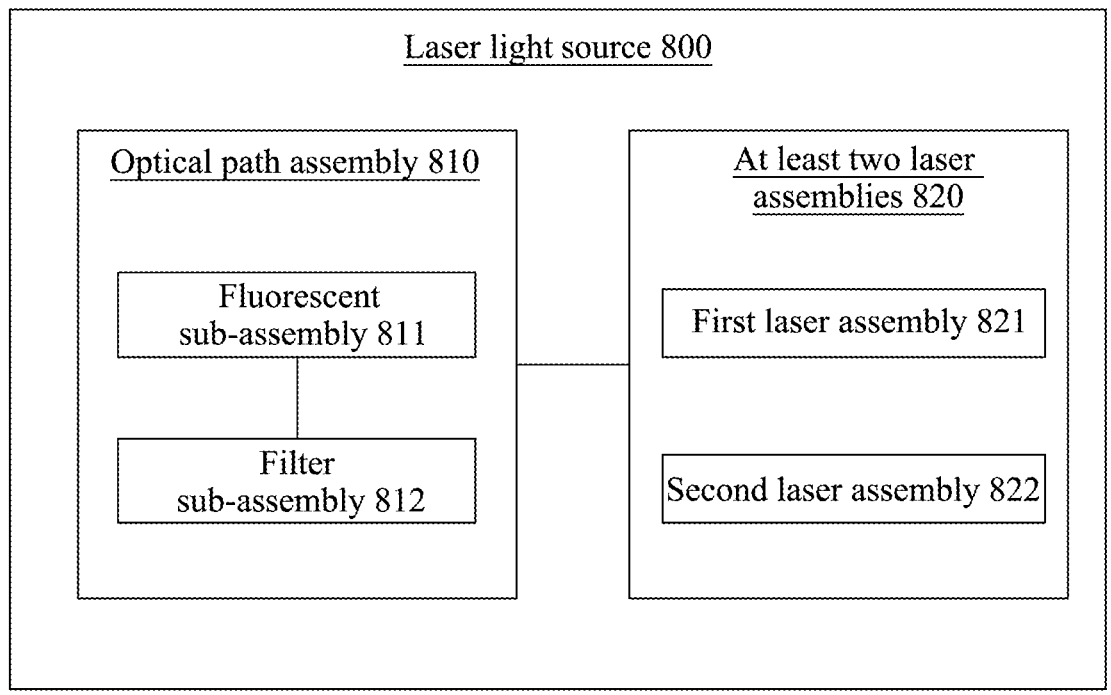
FIG. 8 is a structural block diagram of a laser light source provided in an embodiment of the present application.

FIG. 8 is a structural block diagram of a laser light source provided in an embodiment of the present application. The laser light source 800 includes an optical path assembly 810 and at least two laser assemblies 820, where the optical path assembly 810 includes a fluorescent sub-assembly 811, and the at least two laser assemblies 820 include a first laser assembly 821 for emitting laser light in a first color, and a second laser assembly 822 for emitting laser light in a second color.

The first laser assembly 821 is configured to continuously output the laser light in the first color from the laser light source 800 during an output time interval of a ray in the first color.

The second laser assembly 822 and the fluorescent sub-assembly 811 are configured to, during at least part of the output time interval of the ray in the first color, induce fluorescence in the first color output from the laser light source 800.

In some embodiments, the optical path assembly 810 further includes a filter sub-assembly 812, and the fluorescent sub-assembly 811 includes a partition for fluorescent in a third color for inducing the fluorescence in the third color, where the fluorescence in the third color is mixed fluorescence combining the fluorescence in the first color and fluorescence in a fourth color.

The second laser assembly 822 is configured to input laser light in the second color into the partition for the fluorescent in the third color of the fluorescent sub-assembly 811 to induce fluorescence in the third color during the at least part of the output time interval of the ray in the first color.

The filter sub-assembly 812 is configured to filter out the fluorescence in the fourth color from the fluorescence in the third color to derive the fluorescence in the first color.

The optical path assembly 810 is configured to output the fluorescence in the first color from the laser light source 800.

In view of the foregoing, in according to the laser light source provided in the embodiment of the present application, a first laser assembly outputs laser light in a first color from a laser light source during an output time interval of a ray in the first color, while a fluorescent sub-assembly is excited with laser light in a second color emitted by a second laser assembly to induce fluorescence in the first color, and output the fluorescence in the first color from the laser light source, thus enabling the laser light source to simultaneously output both the laser light in the first color and the fluorescence in the first color during the output time interval of the ray in the first color. The fluorescence in the first color has a relatively wider spectrum, and is thus less likely to interfere with the laser in the first color. This solves the problem in the related art that an imaging quality of the rays emitted by the light source apparatus is significantly degraded by interference fringes caused by rays with long wavelength among rays emitted by the light source apparatus. The technical effect is achieved in terms of avoiding the speckle effect caused by the coherence effect of the rays and enhancing imaging quality of the rays.

Figure 9:
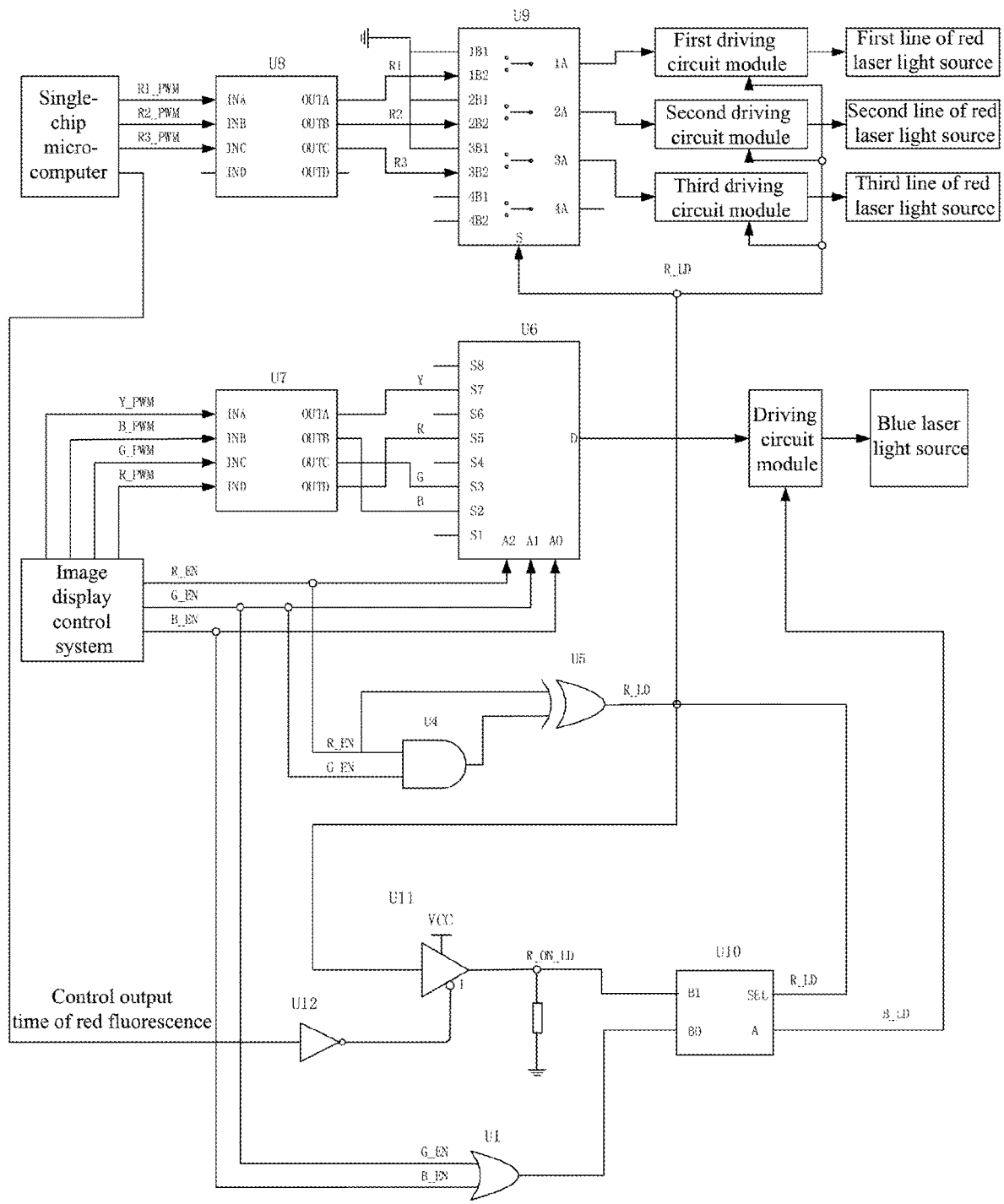
FIG. 9 is a schematic structural diagram of a laser light source provided in an embodiment of the present application.

FIG. 9 is a schematic structural diagram of a laser light source. The structure for controlling the blue laser light source is essentially the same as that of FIG. 6.

An image display control system may be a digital micromirror device (DMD) primary control chip to output a red light optical power R_PWM signal, a green light optical power G_PWM signal, a blue light optical power B_PWM signal and a yellow light optical power Y_PWM. These signals are inputted into four input pins INA, INB, INC and IND of a first digital-to-analog converter U7. Analog optical power signals of the red light, green light, blue light and yellow light come out of OUTA, OUTB, OUTC and OUTD of the first digital-to-analog converter U7, and are inputted into input pins S5, S3, S2 and S7 of a first selector U6, respectively. The first selector U6 can be 8-to-1 data selector that operates via data selection terminals (address terminals) A2, A1 and A0 to select one of eight input data lines according to eight combinations of binary encodings. Red, green and blue light enable signals sent from the image display control system R_EN, G_EN, B_EN are inputted sequentially into the address terminals A2, A1 and A0 of the first selector U6 to select a timing sequence output for the green light, blue light and yellow light according to the binary encodings. A driving circuit module is configured to light the laser light source.

A single-chip microcomputer may output three lines of red light optical power signals R1_PWM, R2_PWM and R3_PWM, which are inputted into a second digital-to-analog converter U8. They come out of the U8 and are inputted into a second selector U9. The second selector U9 may be controlled via R_LD. Having been selected by the second selector U9, the three lines of signals may control three lines of red laser light sources, respectively, via three driving circuit modules, which allows for reducing a speckle effect caused by high coherence of the red laser light.

Additionally, an embodiment of present application also provides a laser projector, which includes an optical engine illuminating apparatus and a laser light source shown in the foregoing embodiments.

As used herein, the terms "first", "second", "third" and, "fourth" are used for descriptive purposes only, and are not to be construed as indicating or implying a relative importance. The term "multiple" refers to two or more, unless specified otherwise.

In the embodiments provided in the present application, it should be understood that the disclosed apparatus and method may be implemented by other means. For instance, the apparatus embodiments described above are merely illustrative. For instance, the units are separated by their logical functions only, and other separations are possible in practical implementation. For instance, multiple units or components may be combined, or be integrated with another system, or some features may be omitted or skipped. In addition, the inter-couplings illustrated or discussed, whether a direct coupling or communication connection, may be an indirect coupling or communication connection via some kind of interface, apparatus or unit, and may be electrical, mechanical or otherwise.

The units described as separate components may or may not be physically separated, and the components displayed as a unit may or may not be a physical unit, that is, they may be located at one place, or may be distributed to multiple network elements. Some or all of the units may be selected according to actual needs to achieve the purpose of the solution of the embodiments.

It will be understood by those skilled in the art that all or part of the steps of the foregoing embodiments may be implemented by hardware alone, or hardware in relation to program instructions. The program may be stored in a computer readable storage medium. The storage medium mentioned in the foregoing may be a read-only memory, a magnetic disk, a compact disk or the like.

The foregoing are merely preferred embodiments of, rather than limitations over, the present application. Any and all modification, equivalent substitution, improvement or the like within the spirit and concept of the present application shall fall within the protection scope of the present application.

What is claimed is:

1. A laser light source, comprising:
   an optical path assembly, comprising a fluorescent sub-assembly;
   at least two laser assemblies, comprising:
   a first laser assembly, configured to emit laser light in a first color and continuously output the laser light in the first color during an output time interval of a ray in the first color, and a second laser assembly, configured to emit laser light in a second color and excite a fluorescent sub-assembly with the laser light in the second color to induce fluorescence in the first color to be outputted from the laser light source during at least part of the output time interval of the ray in the first color;

wherein the at least part of the output time interval comprises multiple non-continuous sub-time intervals within the output time interval of the ray in the first color.

2. The laser light source according to claim 1, wherein the optical path assembly further comprises a filter sub-assembly, and the fluorescent sub-assembly comprises a partition for fluorescent in a third color for inducing the fluorescence in the third color, wherein the fluorescence in the third color is mixed fluorescence combining the fluorescence in the first color and fluorescence in a fourth color;

the second laser assembly is configured to input laser light in the second color into the partition for the fluorescent in the third color of the fluorescent sub-assembly to induce the fluorescence in the third color during the at least part of the output time interval of the ray in the first color; and the filter sub-assembly is configured to filter out the fluorescence in the fourth color from the fluorescence in the third color to derive the fluorescence in the first color.

3. The laser light source according to claim 2, wherein the partition for the fluorescent in the third color comprises a first partition for the fluorescent in the third color and a second partition for the fluorescent in the third color.

4. The laser light source according to claim 3, wherein the second partition for the fluorescent in the third color is configured to generate the fluorescence in the third color for further deriving the fluorescence in the first color.

5. The laser light source according to claim 2, wherein the third color is yellow, and the fourth color is green.

6. A laser projector, comprising an optical engine illuminating apparatus and a laser light source according to claim 2.

7. The laser light source according to claim 1, wherein the multiple non-continuous sub-time intervals are uniformly distributed in the output time interval of the ray in the first color.

8. The laser light source according to claim 1, wherein the first color is red, and the second color is blue.

9. A laser projector, comprising an optical engine illuminating apparatus and a laser light source according to claim 1.

10. A laser light source driving method, comprising:

continuously outputting, by a first laser assembly, laser light in a first color during an output time interval of a ray in the first color; and during at least part of the output time interval of the ray in the first color, exciting a fluorescent sub-assembly with laser light in a second color to induce fluorescence in the first color, and outputting the fluorescence in the first color, the laser light in the second color being emitted by a second laser assembly;

wherein the at least part of the output time interval comprises multiple non-continuous sub-time intervals within the output time interval of the ray in the first color.

11. The method according to claim 10, wherein the multiple non-continuous sub-time intervals are uniformly distributed in the output time interval of the ray in the first color.

12. The method according to claim 10, wherein the exciting a fluorescent sub-assembly with laser light in a second color to induce fluorescence in the first color, and outputting the fluorescence in the first color, the laser light in the second color being emitted by a second laser assembly comprises:

inputting, by the second laser assembly, laser light in the second color into a partition for fluorescent in a third color of the fluorescent sub-assembly to induce the fluorescence in the third color during the at least part of the output time interval of the ray in the first color, wherein the fluorescence in the third color is mixed fluorescence combining the fluorescence in the first color and fluorescence in a fourth color;

filtering out, by a filter sub-assembly, the fluorescence in the fourth color from the fluorescence in the third color to derive the fluorescence in the first color; and outputting the fluorescence in the first color from a laser light source.

13. The method according to claim 12, wherein the third color is yellow, and the fourth color is green.

14. The method according to claim 12, wherein the fluorescent sub-assembly comprises a first partition for the fluorescent in the third color and a second partition for the fluorescent in the third color.

15. The method according to claim 14, wherein the first partition for the fluorescent in the third color is configured to perform an excitation to derive the fluorescence in the third color, and the second partition for the fluorescent in the third color is configured to generate the fluorescence in the third color for further generating the fluorescence in the first color.

16. The method according to claim 10, wherein the first color is red, and the second color is blue.

* * * * *